United States Patent Office 2,695,318
Patented Nov. 23, 1954

2,695,318

PREPARATION OF ACETALS FROM ACID HALIDES

Wolfgang Ernst Thiele, Bergisch-Gladbach, Germany, assignor to Adolf Christian Joseph Opfermann, Bergisch-Gladbach, Germany No Drawing. Application February 21, 1951, Serial No. 212,203

Claims priority, application Netherlands March 1, 1950

14 Claims. (Cl. 260—611)

This invention relates to improvements in the preparation of acetals. It relates particularly to preparation of acetals from acid halides.

The preparation of aldehyde acetals is effected according to the conventional processes by reacting the aldehydes with corresponding alcohols. Aldehydes themselves are in part very unstable and are subject to undesirable side reactions, such as condensation and polymerization. For this reason certain aldehydes can not be directly isolated. However, acetals are not subject to the aforementioned disturbing side reactions and are able under certain conditions to react in the same manner as aldehydes, so that the isolation of the aldehydes is frequently no longer necessary.

One object of this invention is the preparation of acetals directly from acid halides and thus avoid the above difficulties. This and further objects will become apparent from the following description and the examples.

According to the invention it has been found that acetals may be prepared from acid halides in a single step. The preparation is effected by catalytically treating the acid halides with hydrogen in the presence of an ortho-ester. The ortho-esters of silicic and formic acid have been found particularly effective. The treatment may be carried out with excess pressure or without pressure. The reaction takes place in accordance with the following formula:

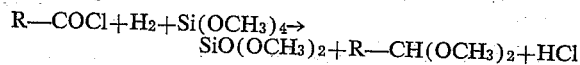

R—COCl+H₂+Si(OCH₃)₄→
SiO(OCH₃)₂+R—CH(OCH₃)₂+HCl

By suitable selection of the alcohol used for the preparation of the ortho-esters, it is possible to produce acetals in which the desired alcohol again appears. It is possible to effect the reduction of the acid halide in the presence of a solvent which is inert to the reaction as for example, ether, benzol, decahydronaphthalene, dichlorobenzene or nitrobenzene. An excess of ortho-ester may be used instead of the inert solvent.

The reaction may be carried out in either a liquid or gaseous phase.

In operating in the liquid phase it is preferable to use temperatures between 100 and 140° C. while temperatures between 200 and 250° C. are preferable when operating in the gas phase. It is possible when operating in the gas phase to do so in the presence of an inert carrier gas. The carrier gas which may also consist of an excess of hydrogen is used in this case instead of a solvent, the catalyst being distributed in the customary manner in a catalyst tube. The catalysts which are adapted for carrying out the method according to the invention consist, for example, of palladium silica gel, palladium barium sulfate, nickel, for example, the form of Raney nickel, or platinum.

In the reduction of compounds containing double bonds which are to be retained, for instance, the reduction of oleichalide, it is advisable to use catalyst poisons or catalysts having a selective action. In this way it is possible to obtain acetals which still contain the double bond. The hydrogen halide, which forms during the reaction, also acts catalytically to a certain extent on the acetalization of the intermediary aldehyde produced in cooperation with the ortho-ester. It has been found particularly advantageous when proceeding according to the invention to use γ-halogenbutyryl halide. In this connection corresponding halogen butyraldehyde acetals are obtained in excellent yields.

It is possible according to the invention to use as a starting material not only the halides of monocarboxylic acid but also the halides or polybasic carboxylic acid. When so proceeding the acetals of corresponding polyvalent aldehydes are obtained in good yields. This is surprising and unexpected as no halides of polyvalent acids, when proceeding according to Rosenmund's method, are obtained.

For example, in the reduction of succinic acid dihalide or halogen succinic halide, succinic aldehyde acetal or halide succinic aldehyde acetal respectively is obtained in good yield.

The yield of acetals is between 50 and almost 100% of the theoretical quantity computed on the basis of acid halide. The method is particularly adapted for the preparation of acetals from aldehydes which can not be obtained by the methods heretofore known, or obtained in poor yields by these known methods.

The acetals may be used as intermediates for organic synthesis as well as solvents and softeners and as aroma and taste-imparting substances of all kinds. Acetals of p-nitrobenzaldehydes may also be used as sweetening substances.

The following examples are given by way of illustration and not limitation, the invention being limited by the appended claims or their equivalents.

EXAMPLE 1

In a round flask provided with agitator, reflux condenser and gas introduction tube, there are placed one mol acid halide, 6 grams palladium-barium sulfate contact (15% Pd) or 5 grams palladium on silica gel (2%)—the contact may be reused for several reactions. Thereupon half of a quantity of 500 grams orthoester is added. The acid halide and the second half of the aforementioned 500 grams orthoester are then poured in. Possibly small quantities of catalyst poison can furthermore be added. The flask is now sealed and the gas inlet tube is connected to the hydrogen cylinder. Hydrogen is passed through with violent agitation, and the discharging gas can be passed through water in order to titrimetrically determine with caustic soda solution during the reaction the hydrogen halide which has been liberated.

After the generation of hydrogen halide has slowed down, the admission of the hydrogen is interrupted.

The contents of the flask is thereupon filtered away from the catalyst and distilled.

EXAMPLE 2

In the round flask described in Example 1, which is provided with an agitator, reflux condenser and gas admission tube, there are introduced for one mol of acid halide, 6 grams of palladium barium sulfate catalyst, (5% palladium) or 15 grams palladium on silica gel (2%). Thereupon 300 cc of solvent are added. The acid halide and 10% excess over the stoichiometric quantity of orthoester are then poured in. Small quantities of catalyst poison may also possible be added.

The further treatment is carried out in the manner described under 1. Table I shows the diversified applicability of the method of the present invention by means of which good yields of acetals can be obtained.

TABLE I.—Examples

| Starting substance | Final product | Physical values | Special properties | Yield based on halide |
|---|---|---|---|---|
| Benzoylchloride and $Si(OCH_3)_4$ | $C_6H_5-CH(OCH_3)_2$ <br> Benzaldehydedimethylacetal. | B. P.$_{10}$, 74–78° | Slight odor | 92% of the theoretical amount. |
| Benzoylchloride and $HC(OC_2H_5)_3$ | $C_6H_5-CH(OC_2H_5)_2$ <br> Benzaldehydediethylacetal. | B. P.$_{10}$, 86–89° | do | 68% of the theoretical amount. |
| p-Nitrobenzoylchloride and $Si(OCH_3)_4$ | $O_2N-C_6H_4-CH(OCH_3)_2$ <br> p-Nitrobenzaldehydedimethylacetal. | B. P.$_8$, 145–147° (F. P. 24°). | Sweet taste | 76% of the theoretical amount. |
| p-Nitrobenzoylchloride and $Si(OC_2H_5)_4$ | $O_2N-C_6H_4-CH(OC_2H_5)_2$ <br> p-Nitrobenzaldehydediethylacetal. | B. P.$_8$, 152–155° (F. P. 35/7°). | Very sweet taste | 72% of the theoretical amount. |
| p-Nitrobenzoylchloride and $HC(OC_2H_5)_3$ | $O_2N-C_6H_4-CH(OC_2H_5)_2$ <br> p-Nitrobenzaldehydediethylacetal. | B. P.$_8$, 152–155° | do | 69% of the theoretical amount. |
| Isovaleroylchloride and $Si(OCH_3)_4$ | $(CH_3)_2CH-CH_2-CH(OCH_3)_2$ <br> Isovaleraldehydedimethylacetal. | B. P. 128–129° | Candylike odor | 85% of the theoretical amount. |
| n-Caproic chloride and $HC(OC_2H_5)_3$ | $CH_3-(CH_2)_4-CH(OC_2H_5)_2$ <br> Capronaldehydediethylacetal | B. P. 155–158° | Fruity odor | 66% of the theoretical amount. |
| γ-Chlorobutyrylchloride and $Si(OCH_3)_4$ | | | | 72% of the theoretical amount. |
| γ-Chlorobutyrylbromide and $Si(OCH_3)_4$ | $Cl.CH_2-CH_2-CH_2-CH(OCH_3)_2$ | B. P.$_{12}$, 88–91° | Pungent odor | 87% of the theoretical amount. |
| γ-Chlorobutyrylchloride and $HC(OCH_3)_3$ | γ-Chlorobutyraldehydedimethylacetal. | B. P.$_{25}$, 106–107° | | 75% of the theoretical amount. |
| Succinylchloride <br> $CH_2-COCl$ <br> $\|$ <br> $CH_2-COCl$ $+Si(OCH_3)_4$ | Succindialdehydetetramethylacetal <br> $(CH_3O)_2CH-CH_2-CH_2-CH(OCH_3)_2$ | B. P.$_{12}$, 77–78° | | 61% of the theoretical amount. |
| Oleic chloride $Si(OCH_3)_4$ | Oleicaldehydedimethylacetal <br> $CH_3-(CH_2)_7-CH=CH-(CH_2)_7-CH(OCH_3)_2$ | B. P.$_{10}$, 185–190° | | 58% of the theoretical amount. |

The example of the preparation of succindialdehyde tetramethylacetal shows that it is possible to also obtain from the halides of dicarboxylic acids good yields of the corresponding acetals. The example of reduction of oleic acid chloride shows that the double bond is retained under the reaction conditions.

I claim:
1. Method for the preparation of acetals comprising intimately contacting a carboxylic acid halide in the presence of a catalyst selected from the group consisting of palladium silica gel, palladium barium sulfate, nickel and platinum and an ortho-ester with hydrogen at elevated temperatures, and recovering an acetal.
2. Method according to claim 1, in which said contacting is effected at a pressure in excess of atmospheric pressure.
3. Method according to claim 1, in which said ortho-ester is an ortho-ester of at least one of silica and formic acid.
4. Method according to claim 1, in which said contacting is effected in the presence of an organic solvent.
5. Method according to claim 4, in which said solvent is at least one member of the group consisting of ether, benzol, decahydronaphthalene, dichlorobenzene and nitrobenzene.
6. Method according to claim 1, in which said contacting is effected in the liquid phase at a temperature of about 100 to 140° C.
7. Method according to claim 1, in which said contacting is effected in the gas phase at a temperature of about 200 to 250° C.
8. Method according to claim 7, in which said contacting is effected in the presence of an inert carrier gas.
9. Method according to claim 1, in which said contacting is effected in the presence of a catalyst poison.
10. Method according to claim 1 in which said carboxylic acid halide is a saturated aliphatic carboxylic acid halide.
11. Method according to claim 1 in which said carboxylic acid halide is an unsaturated aliphatic carboxylic acid halide.
12. Method according to claim 1 in which said carboxylic acid halide is an aromatic carboxylic acid halide.
13. Method according to claim 1 in which said carboxylic acid halide is a substituted carboxylic acid halide.
14. Method according to claim 1 in which said carboxylic acid halide is a dicarboxylic acid halide.

References Cited in the file of this patent

Post, The Chemistry of the Aliphatic Ortho Esters, pp. 45, 46 and 144 (1943), Reinhold Publishing Corp., New York, N. Y.

Gilman, Organic Chemistry—An Advanced Treatise, vol. 1, 2nd Ed. pp. 808–809 (1943), John Wiley and Sons, New York, N. Y.